US012592588B2

(12) United States Patent
Thrimawithana et al.

(10) Patent No.: US 12,592,588 B2
(45) Date of Patent: Mar. 31, 2026

(54) WIRELESS POWER TRANSFER COUPLER

(71) Applicant: Auckland UniServices Limited,
Auckland (NZ)

(72) Inventors: Duleepa Jayanath Thrimawithana,
Auckland (NZ); Grant Anthony Covic,
Auckland (NZ); Seho Kim, Auckland
(NZ); **Osama Abdulameer Ali Ahmed
Ali Almulla,** Auckland (NZ)

(73) Assignee: Auckland UniServices Limited,
Auckland (NZ)

( * ) Notice: Subject to any disclaimer, the term of this
patent is extended or adjusted under 35
U.S.C. 154(b) by 0 days.

(21) Appl. No.: 18/984,149

(22) Filed: Dec. 17, 2024

(65) Prior Publication Data

US 2025/0132610 A1 Apr. 24, 2025

Related U.S. Application Data

(63) Continuation of application No.
PCT/IB2023/056434, filed on Jun. 21, 2023.

(30) Foreign Application Priority Data

Jun. 21, 2022 (NZ) ........................................ 789640

(51) Int. Cl.
*H02J 50/40* (2016.01)
*H02J 50/12* (2016.01)
*H02J 50/70* (2016.01)
(52) U.S. Cl.
CPC ............ *H02J 50/402* (2020.01); *H02J 50/12*
(2016.02); *H02J 50/70* (2016.02)
(58) Field of Classification Search
CPC .......... H02J 50/402; H02J 50/12; H02J 50/70;
H02J 50/005; H02J 50/10; H02J 2310/48;
H02J 50/40; B60L 53/30; B60L
2270/147; B60L 53/122; H01F 3/14;
H01F 27/02; H01F 27/366; H01F 38/14;
H01F 2027/348; H01F 27/2871; H01F
27/34
See application file for complete search history.

(56) References Cited

U.S. PATENT DOCUMENTS

| | | | | |
|---|---|---|---|---|
| 10,984,946 | B2 * | 4/2021 | Percebon | .............. H01F 27/366 |
| 11,961,650 | B2 * | 4/2024 | Lohmann | ................ H02J 50/70 |
| 2019/0363565 | A1 * | 11/2019 | Graham | .................. H01F 27/36 |
| 2021/0143684 | A1 * | 5/2021 | Sumiya | .................. H02J 50/90 |
| 2022/0060052 | A1 | 2/2022 | Woronowicz et al. | |

FOREIGN PATENT DOCUMENTS

| | | |
|---|---|---|
| JP | 2015164152 A | 9/2015 |
| WO | 2019/074378 A1 | 4/2019 |

OTHER PUBLICATIONS

International Search Report and Written Opinion in counterpart
International Application No. PCT/IB2023/056434, mailed Aug. 11,
2023, 13 pages.

* cited by examiner

*Primary Examiner* — Lincoln D Donovan
*Assistant Examiner* — Alex W Lam
(74) *Attorney, Agent, or Firm* — Edell, Shapiro & Finnan,
LLC

(57) ABSTRACT

A multiphase wireless power transfer pad has at least a first
coil and a second coil and permeable material which
includes a region of reduced magnetic permeability config-
ured to minimise coupling between the first and second
coils.

19 Claims, 14 Drawing Sheets

Showing coils (with enclosures) and ferrites

Showing coils (no enclosures) and ferrites

WIRELESS POWER TRANSFER COUPLER

FIELD

This disclosure relates to a wireless power transfer coupling structures which are commonly referred to as wireless power transfer pads. The disclosure has particular relevance to polyphase pads.

BACKGROUND

Inductive power transfer (IPT), also referred to as wireless power transfer (WPT) is gaining popularity as a means of transferring electrical power between two systems without any physical contact. This technology has been used to provide power in a variety of consumer and industrial applications. One of the promising applications of IPT systems is to charge and/or power electric vehicles (EVs). Another application is charging mobile electronic devices such as mobile telephones, tablets and laptops. In this disclosure reference is made to EV applications as a primary example, but the disclosed subject matter is equally applicable to other charging or powering applications.

IPT systems use coupling structures to transfer power by magnetic coupling. A primary coupler or pad has a coil which is energised by a power supply to create a time varying magnetic field. Similarly, a secondary or receiver coupler or pad has a coil within which a voltage and current is induced from the field created by the primary to thereby transfer power from the power supply to a load supplied by the secondary.

Polyphase or multiphase IPT systems, i.e. systems that have more than one phase, are becoming more popular as they can allow more efficient power transfer. A typical polyphase system may be a three-phase system for example. In such a system, each pad typically has three coils, i.e. one coil for each phase.

A common issue in polyphase IPT systems is interphase coupling. This is a situation where the coils of different phases within the same pad are magnetically coupled with each other. This causes interphase (i.e. intercoil) mutual inductance. This phenomenon is generally undesired because it allows power to transfer across different phases within the same pad, whereas the desired outcome is to have all power transferred to one or more phases on the other pad. The effect of interphase coupling at the primary pad is increased reactive loading on the supply, and hence less real power output for the same supply conditions. Therefore, this hampers the system's ability to transfer power. It is also problematic because it will cause the system to become imbalanced if the interphase mutual couplings between the individual phases are not all equal to one another. For example, in a three-phase pad there will be interphase couplings between phases one and two, phases two and three, and phases one and three. In practice, the interphase couplings are unlikely to all be equal. Interphase coupling also makes it practically difficult to use designs which require the ability to drive each phase of the IPT system independently since all phases will naturally interact with one another.

It is an object of the present disclosure to provide a wireless power transfer coupling apparatus that ameliorates one or more of the disadvantages of existing constructions, or which at least provides a useful alternative.

SUMMARY

In an aspect the disclosure provides a multiphase wireless power transfer pad comprising a first coil and a second coil, a permeable layer comprising a permeable material, wherein the permeable material comprises a region of reduced permeability configured to decouple the first coil from the second coil.

In an aspect the disclosure provides a multiphase wireless power transfer pad comprising a first coil and a second coil, a permeable material, or layer comprising a permeable material, wherein the permeable material comprises a region of reduced permeability configured to minimise coupling between the first and second coils.

In an embodiment the region of reduced magnetic permeability provides a controlled reluctance path between the first coil and the second coil.

In an embodiment the coils are immediately adjacent to each other, or spaced a minimal distance apart. The minimal distance may be configured dependent on the coils not adversely magnetically interfering with each other.

In an embodiment the coils extend along a first axis and the region of reduced permeability extends transversely to the first axis. In an embodiment the region of reduced permeability is linear.

In an embodiment the two coils are provided in a first layer.

In an embodiment a third coil is provided in a second layer.

In an embodiment magnetic coupling between the first coil and the third coil is minimised, and wherein magnetic coupling between the second coil and the third coil is minimised.

In an embodiment there is somewhat or substantially balanced coupling between the coils.

In an embodiment wherein the coils are decoupled.

In an embodiment the region of reduced permeability comprises a gap in the permeable layer.

In an embodiment the permeable layer comprises two or more separate or separated blocks of permeable material and the region of reduced permeability comprises a gap between the blocks of permeable material.

In an embodiment each block of permeable material comprises a plurality of pieces of permeable material.

In an embodiment the region of reduced permeability is a region of permeability that is lower relative to other regions of the permeable layer either side of the region of reduced permeability.

In an embodiment the region of reduced permeability is located centrally of the third coil.

In an embodiment the coils all have the same dimensions.

In an embodiment the coils comprise modules.

In an embodiment each coil is contained within a housing.

In an embodiment the pad further comprises a base plate and a cover, and wherein the coils are provided as modules secured between the base plate in the cover.

In an embodiment the pad comprises a three-phase pad.

The disclosure also provides a primary wireless power transfer pad comprising the multiphase wireless power transfer pad according to any one of the preceding claims.

The disclosure also provides a secondary wireless power transfer pad comprising the multiphase wireless power transfer pad according to any one of the preceding claims.

The disclosure also provides a wireless power transfer system comprising a primary pad and a secondary pad including a pad arrangement according to any of the preceding statements.

In another aspect the disclosure also provides a multiphase wireless power transfer pad comprising a first coil and a second coil, a permeable layer comprising a permeable material, wherein the permeable material comprises a region of reduced permeability configured to provide a magnetic coupling between the first and second coils which is of a selected magnitude.

The disclosure also provides a multiphase wireless power transfer pad comprising a first coil and a second coil, the first and second coils being positioned transversely across the pad, a permeable layer comprising a first block of permeable material and a second block of permeable material permeable material, wherein the first and second blocks are separated by a gap and the gap extends longitudinally.

Further aspects will be apparent from the following description.

DRAWING DESCRIPTION

Embodiments or examples will now be disclosed with reference to the accompanying drawings in which.

Figure 11A:
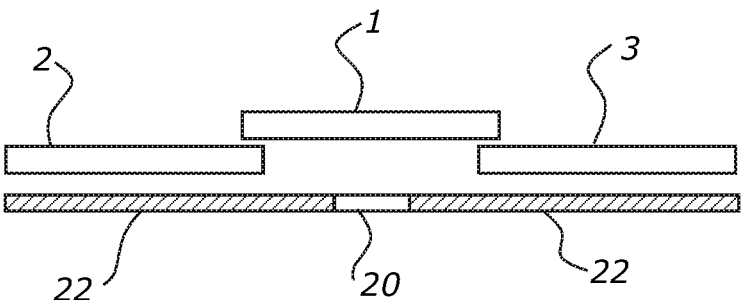
Figure 11B:
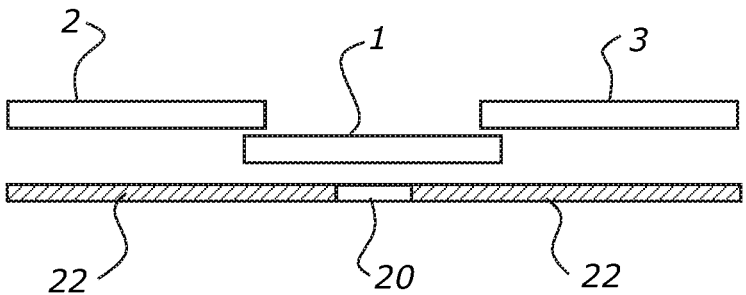
Figure 12:
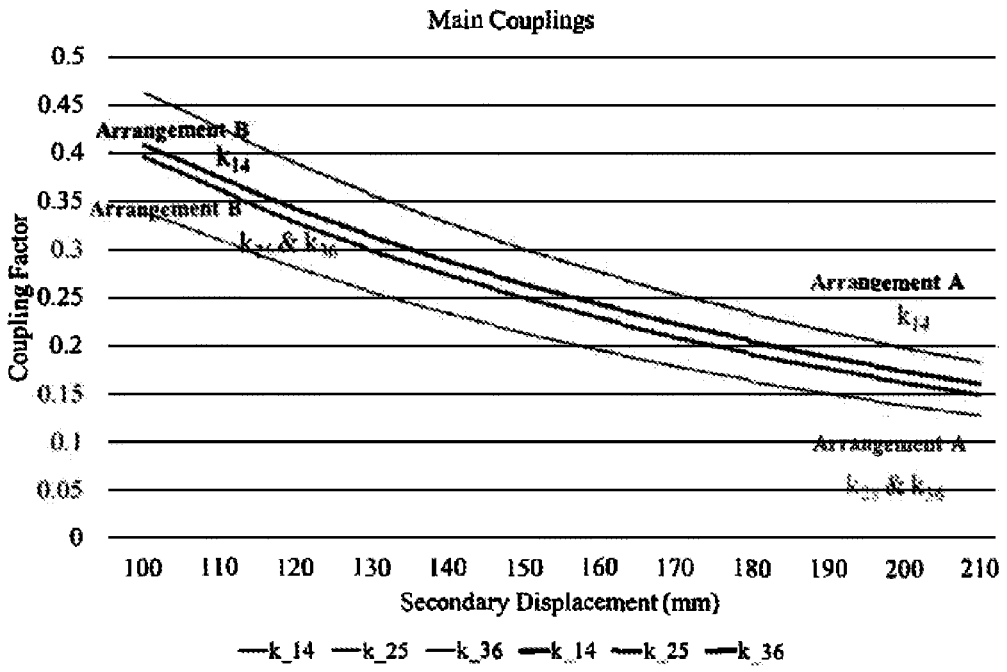
Figure 13:
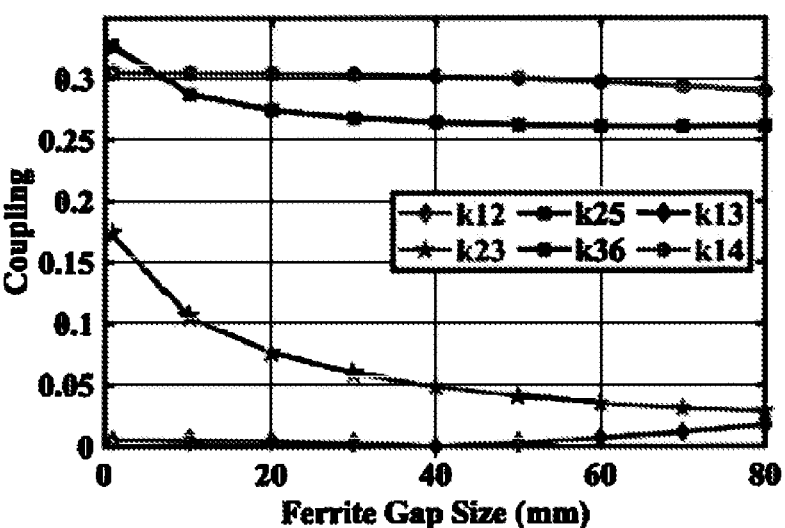
Figure 14:
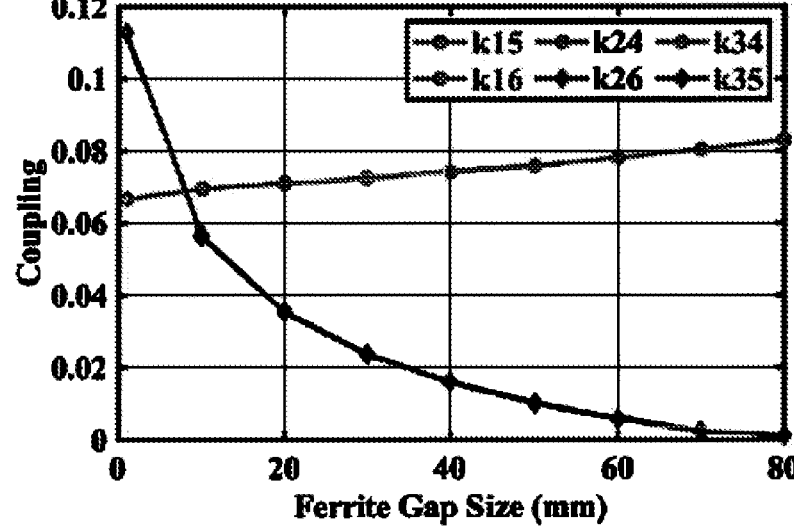
Figure 15:
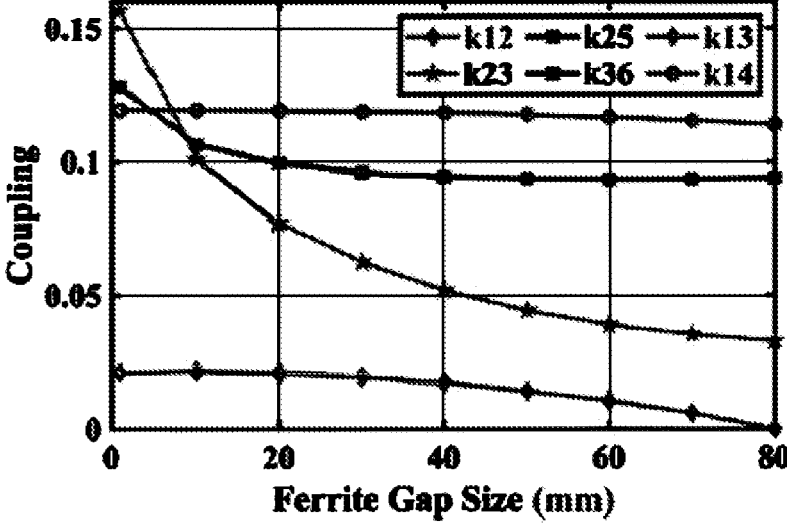
Figure 16:
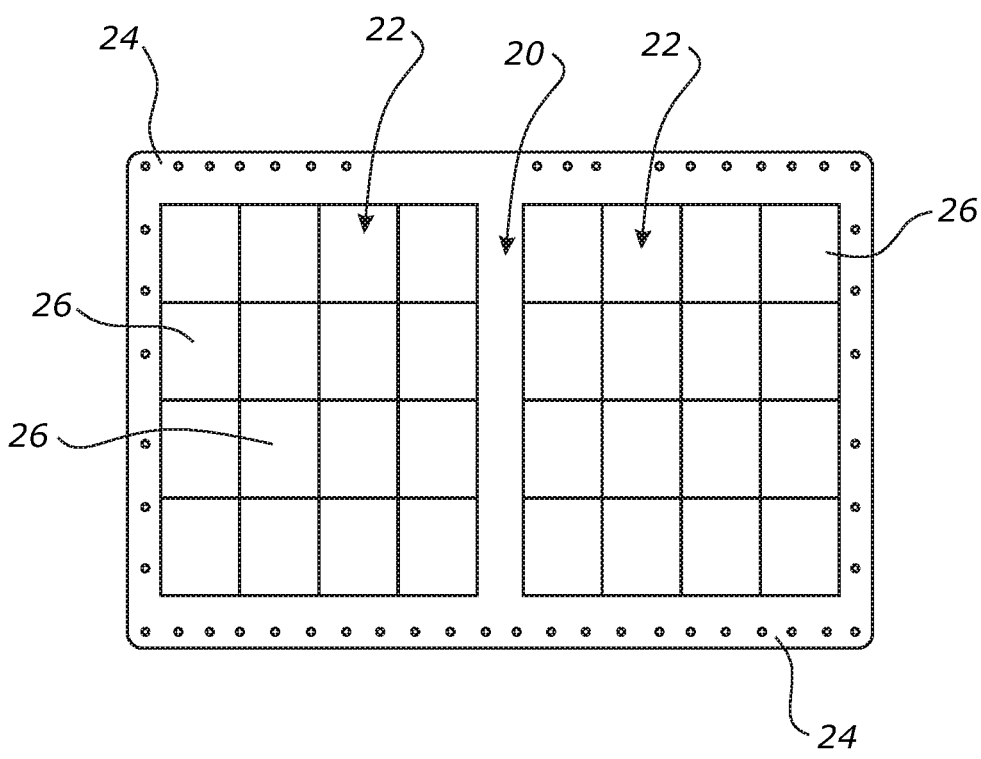
Figure 17:
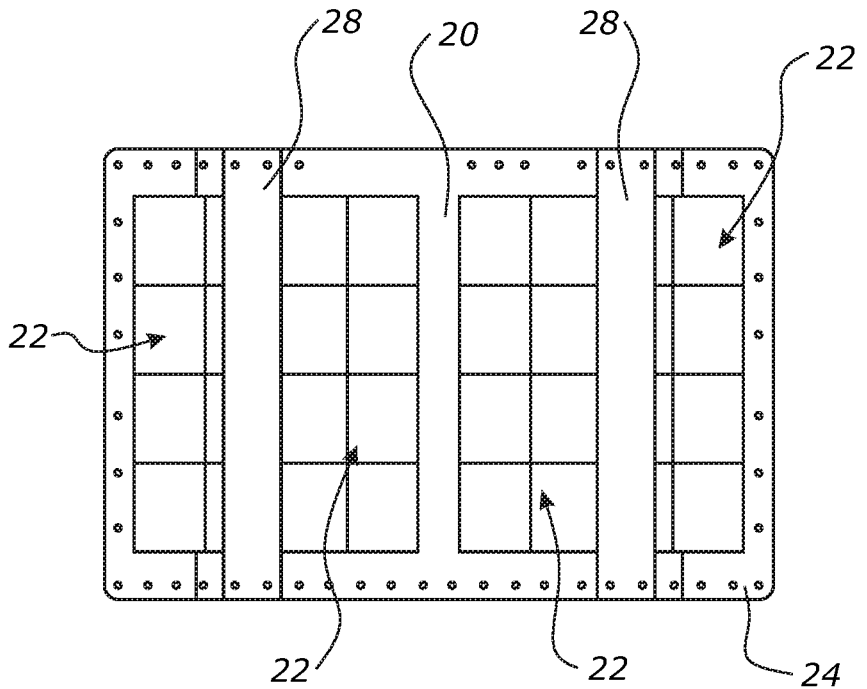
Figure 18:
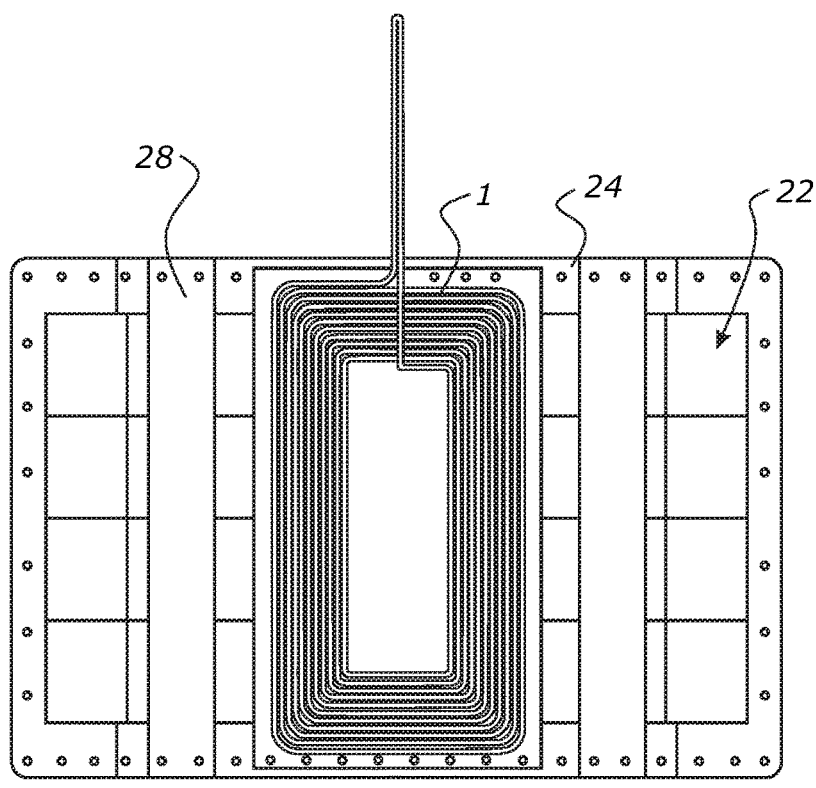
Figure 19:
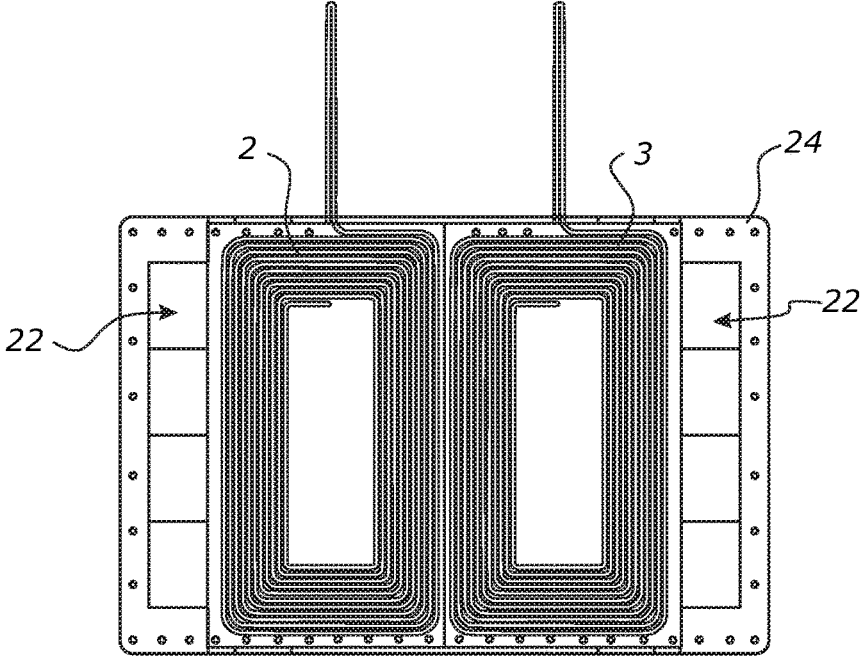
Figure 20:
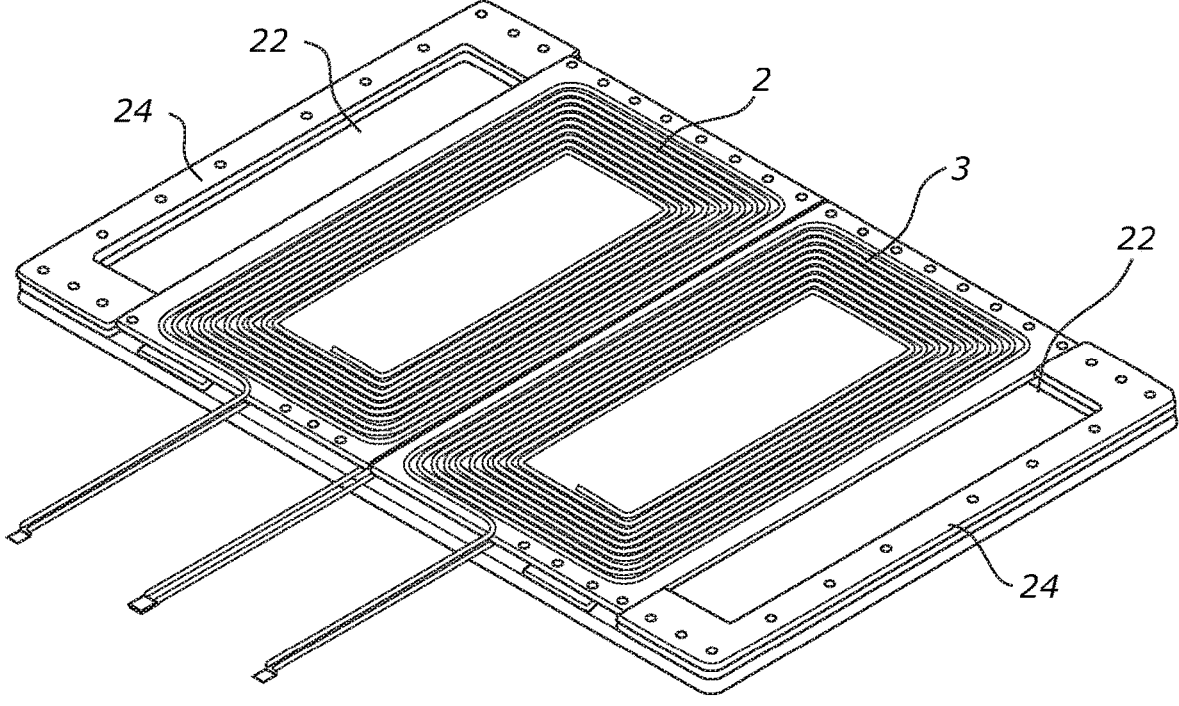
Figure 21:
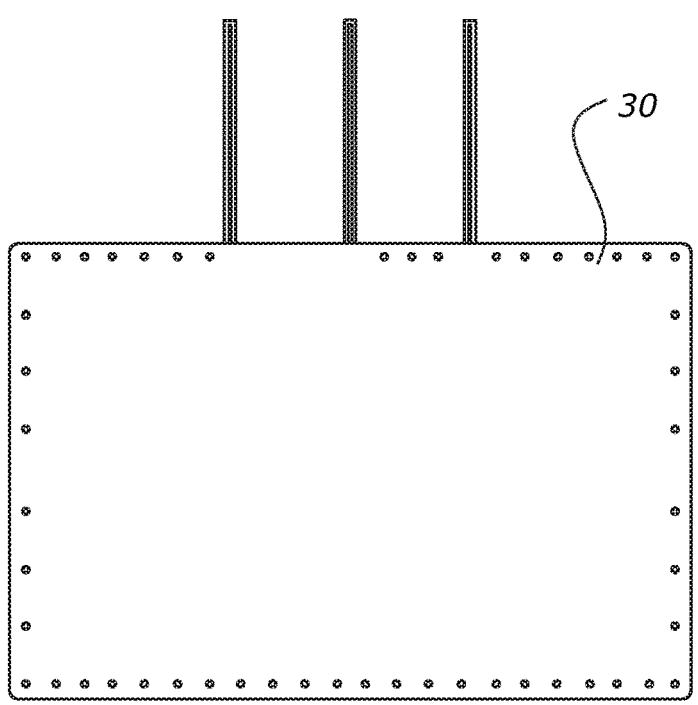

FIG. 11*a* is a diagrammatic cross section showing transversely across a three coil pad having coil Arrangement A;

FIG. 11*b* is a diagrammatic cross section showing transversely across a three coil pad having coil Arrangement B;

FIG. 12 is a graph of main couplings comparison for Arrangement A and Arrangement B;

FIG. 13 is a graph of main and interphase couplings for the block model as the ferrite gap is varied at a separation of 140 mm;

FIG. 14 is a graph of cross couplings for the block model as the ferrite gap is varied at a separation of 140 mm;

FIG. 15 is a graph of main and interphase couplings for the block model as the ferrite gap is varied at a separation of 250 mm;

FIG. 16 is a plan view of a permeable layer in a backplate for a three coil pad;

FIG. 17 is a plan view of the pad according to FIG. 16 but also showing structural members located over the permeable layer;

FIG. 18 is a plan view of the pad according to FIG. 17 but also showing a first or central coil in place;

FIG. 19 is a plan view of the pad according to FIG. 18 but also showing two coils placed over the central coil;

FIG. 20 is a perspective view of the pad according to FIG. 19;

FIG. 21 is a plan view of the pad according to FIGS. 19 and 20 but with a cover plate over the two coils.

Figure 22:
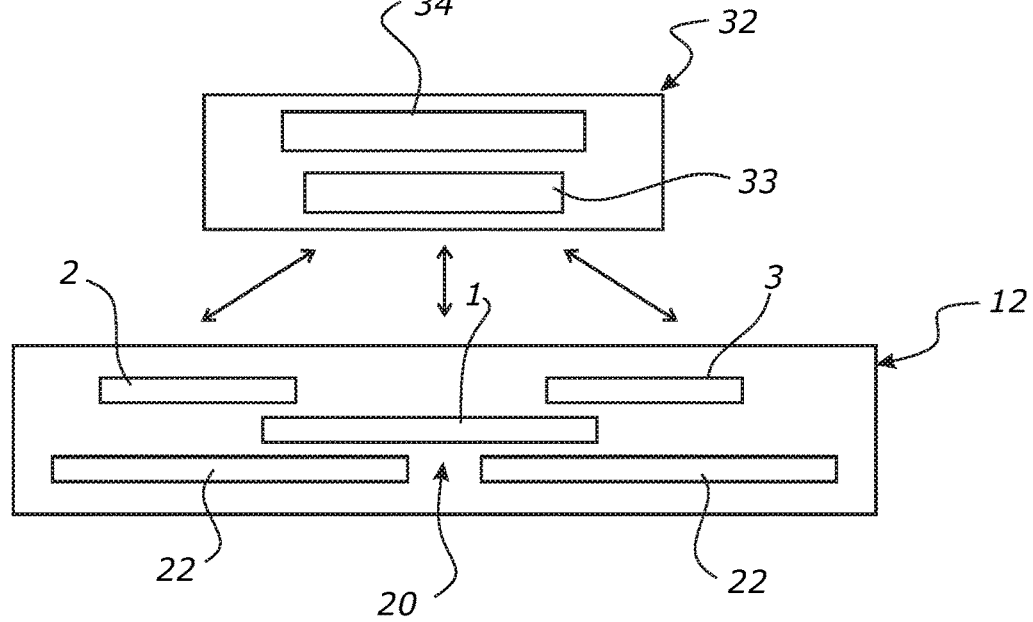

FIG. 22 is a diagrammatic end view of a three coil pad according to FIG. 11*b* in use adjacent to a secondary pad having a single coil.

Figure 23:
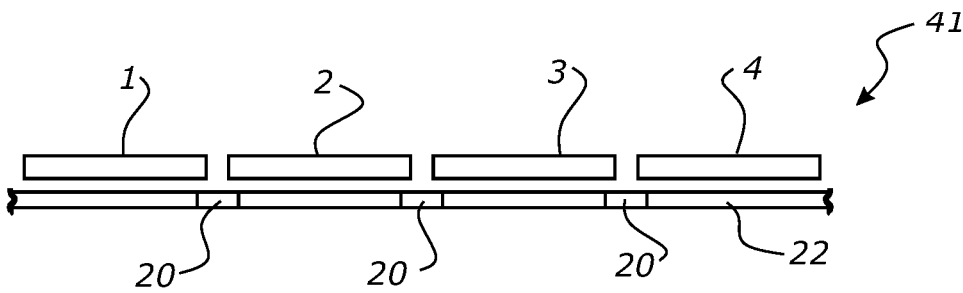

FIG. 23 is a diagrammatic cross-section of a further coupling structure.

Figure 24:
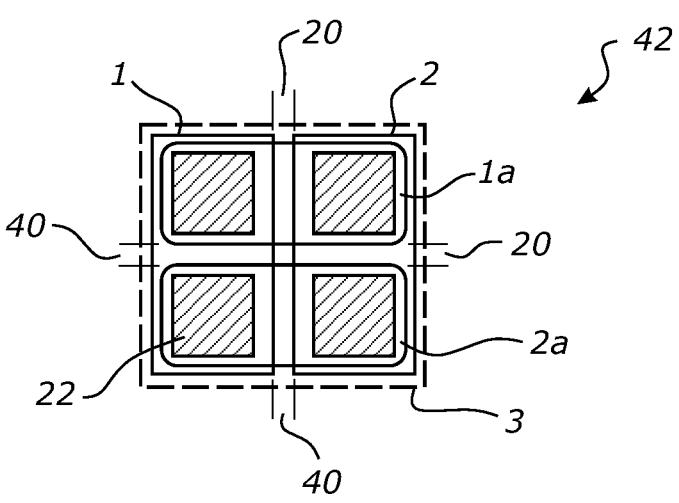

FIG. 24 is a diagrammatic plan view of a further coupling structure.

Figure 25:
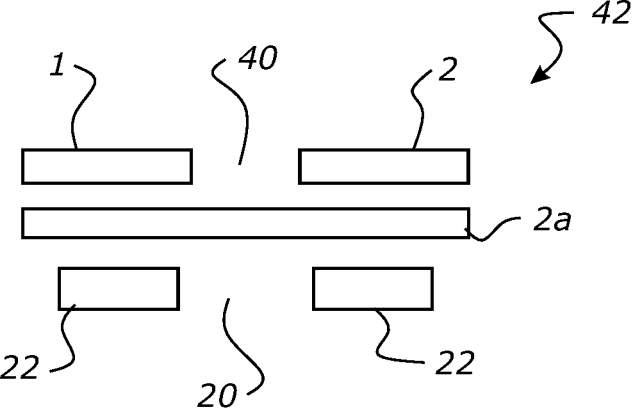

FIG. 25 is a diagrammatic cross-section of the structure of FIG. 24.

DETAILED DESCRIPTION

There has been research into wireless coupler pad configurations which minimize the interphase couplings such that they become negligible. This is known as decoupling the phases or coils in the pad from each other.

One such configuration is referred to as a bipolar pad and is disclosed in patent publication WO2011016737 which is incorporated herein by reference. In WO2011016737, the pad has two flat coils which overlap each other to magnetically decouple the coils and thus decouple the phases.

The concept of decoupling coils or phases is extended to three coils in patent publication WO2013122483 which is also incorporated herein by reference. The pad in WO2013122483 is referred to as a tripolar pad. The tripolar pad has three overlapping coils and the overlap of three coils is optimized so that they are not coupled with one another.

Pad or coupler structures typically include as part of their overall magnetic structure one or more pieces or layers of permeable magnetic material. References to permeable magnetic material in this disclosure refer to materials that have a magnetic permeability that is very much greater than that of air. These materials allow magnetic flux produced by the coils to be concentrated and guided for purposes of magnetic field shaping in order to maximise efficient power transfer wirelessly. An example of a permeable magnetic material which is frequently used in pad structures is ferrite. Although the embodiments disclosed herein use ferrite as an example, it will be understood that other highly permeable materials may alternatively, or additionally, be used.

Figure 1:
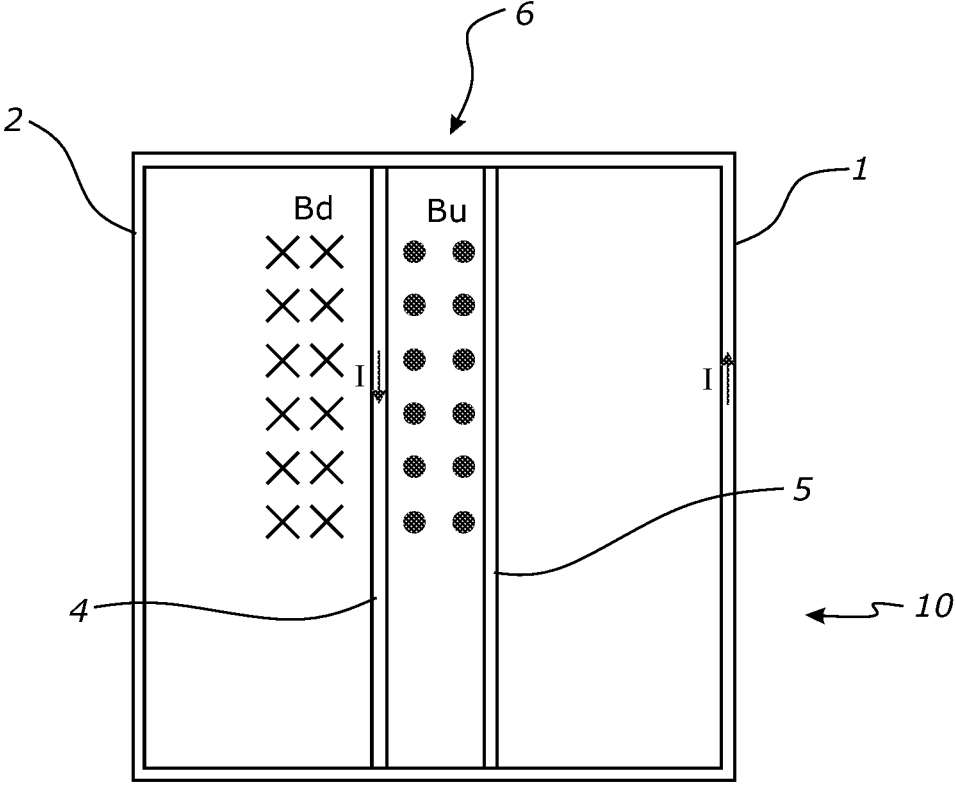
FIG. 1 is a diagrammatic plan view of a known coil arrangement for a polyphase pad having two coils.

The fundamental operation of the bipolar and tripolar pads referred to above is determined by having a specific overlap between each of the coils. An example of this is demonstrated in FIG. 1 in which a coupler or pad 10 is shown diagrammatically having a bipolar pad coil arrangement of two overlapping coils to show how the coils can be decoupled. Coil 1 and coil 2 are arranged as flat rectangles having an overlap region 6. Although the diagram shows rectangles, it will be appreciated that other shapes may be used, for example circles or squares. When Coil 1 in FIG. 1 is energised with current I, the magnetic flux B it induces is orthogonal to the current. As such, the current flowing in the overlap area 6 induces both an upwards flux Bu (shown by solid circles) which is directed out of the page toward the viewer, and a downwards flux Bd (shown by crosses) on Coil 2 as marked in FIG. 1.

If fluxes Bu and Bd do not have the same magnitude, then the coils are coupled to some extent by mutual coupling M between coil 1 and coil 2, which can be designated $M_{12}$. If fluxes Bu and Bd have the same magnitude, then there is no net magnetic flux on coil 2. This means that coil 1 has no effect on coil 2 and conversely coil 2 has no effect on coil 1. Thus, the coils are decoupled. The coupling factor $k_{12}$, which is defined as the net flux experienced by coil 2 relative to the total flux that the coil 1 is generating, is hence also zero.

In practice getting a coupling coefficient of zero is impractical, and hence coils with less than 5% coupling are generally considered to be decoupled.

With both the bipolar pad coil arrangement and the tripolar pad coil arrangement, the overlap distance between the coils is optimised by finding the coil positions which achieve decoupling. Optimising coils positions for decoupling in the presence or permeable material can be complex for both of these coupling structures. In particular, the tripolar pad's geometry is more complex, and this makes it more difficult to construct in practice. Another requirement for the design of coupling structures is to fit coils of maximum size into the overall outer dimension of the structure. This makes the structure efficient as larger coils allow more power to be transferred. In some wireless power transfer applications, such as electric vehicle charging, the overall dimension of a pad may be part of a standard, so the design problem is to provide minimally coupled coils or maximum size within a constrained footprint and without significantly negatively impacting the coupling with another coupling structure. This disclosure therefore describes a multiple coil pad structure or arrangement (i.e. a polyphase pad structure or arrangement) which addresses these issues by using an array of coils such that the pad remains easy to build and spatially efficient whilst also achieving mutual decoupling of the coils within the pad. An embodiment is shown in FIG. 2, referenced in that Figure as pad or coupler 11.

Figure 2:
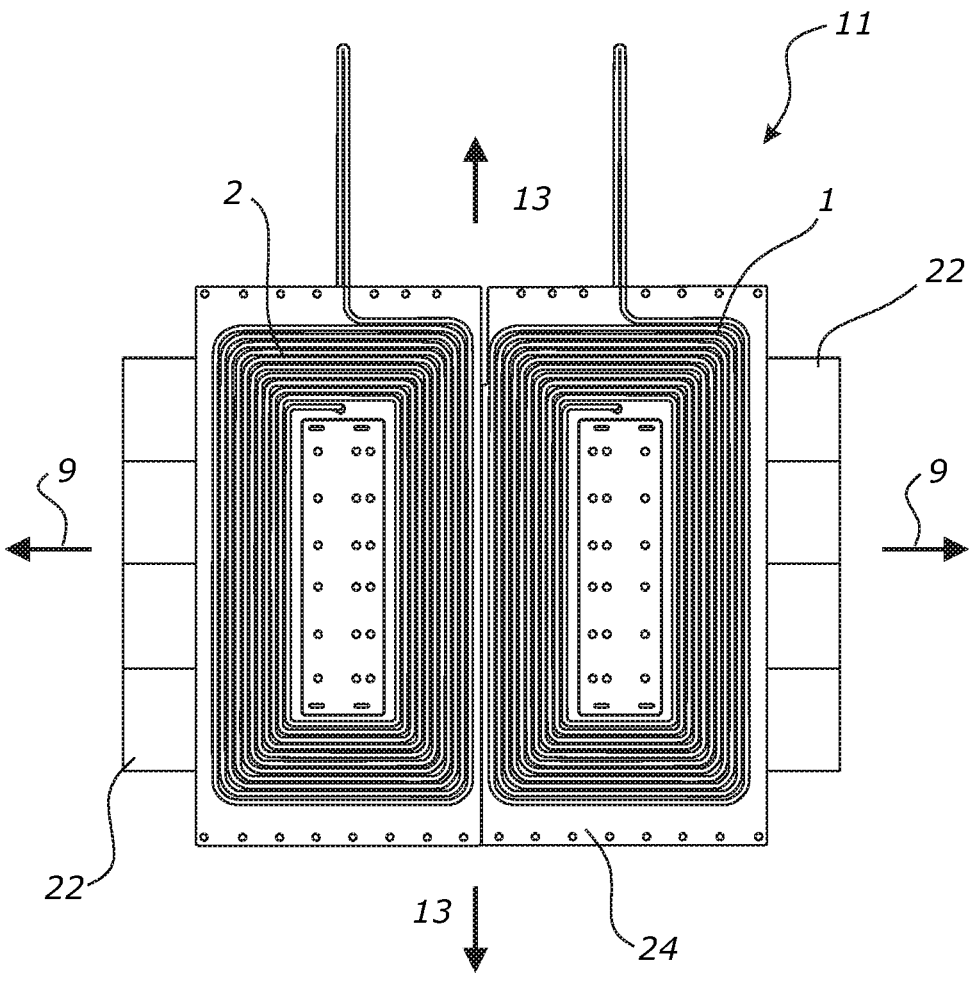
FIG. 2 is plan view of a pad having two coils.

The proposed coil configuration of FIG. 2 has the coils 1 and 2 arranged side-by-side and located on or magnetically close to a layer of permeable material 22, which may be constructed for example from blocks of ferrite. Although the permeable material 22 is referred to herein as being in a layer, it will be understood that in an embodiment the material 22 can be provided in separate blocks or regions which may not resemble a single or continuous layer. In the embodiment shown in FIG. 2 the coils are on or in the same plane, or at least share a common plane i.e. are co-planar, or provided in a layer. In an embodiment the coils 1 and 2 are in different planes or layers. The permeable material 22 guides magnetic flux produced in use by one or both coils 1 and 2 so that the flux passes through the material 22 beneath each coil and exits the material to create a flux path in use that extends out of the page toward the viewer. A magnetic shield 30 (shown in FIG. 21) may be provided to discourage flux arching around the back i.e. underneath the pad.

Shield 30 may be located beneath the material 22 and beneath the coils. Therefore, in an embodiment, permeable material 22 is located between the shield 30 and the coils 1 and 2.

In the construction shown in FIG. 2, rather than decoupling coils 1 and 2 by overlapping the coils, a new approach is disclosed herein in which layer 22, or a portion thereof is configured to create a controlled (e.g. higher) reluctance path than would otherwise be present between the two coils. Such a controlled reluctance path allows the coils to be decoupled, or controllably coupled so that coupling is at a minimum, for example the coils may be coupled to a required or acceptable degree dependent upon the charging application or the power supply being used.

Figure 3:
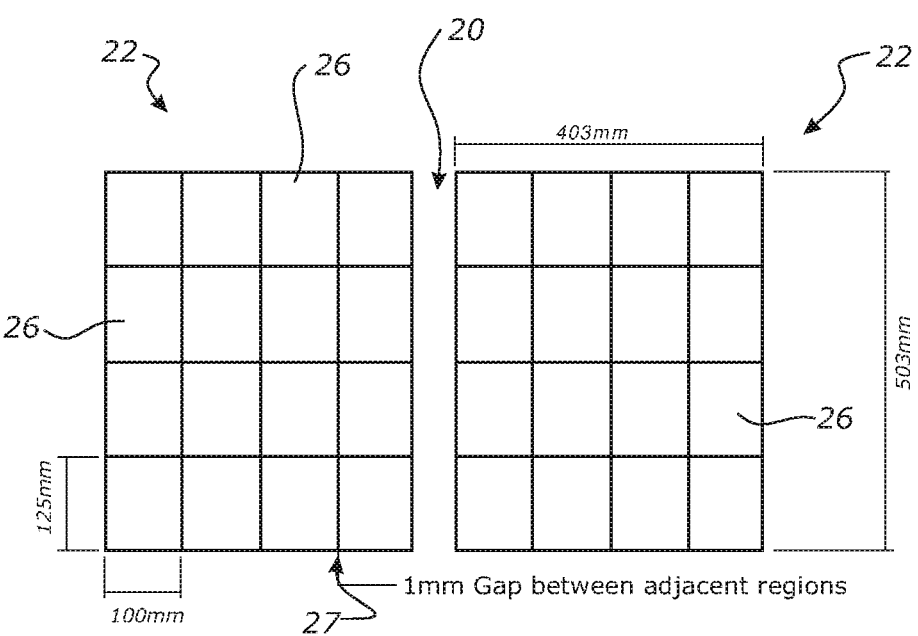
FIG. 3 is a plan view of a permeable layer for the pad of FIG. 2.
Figure 4:
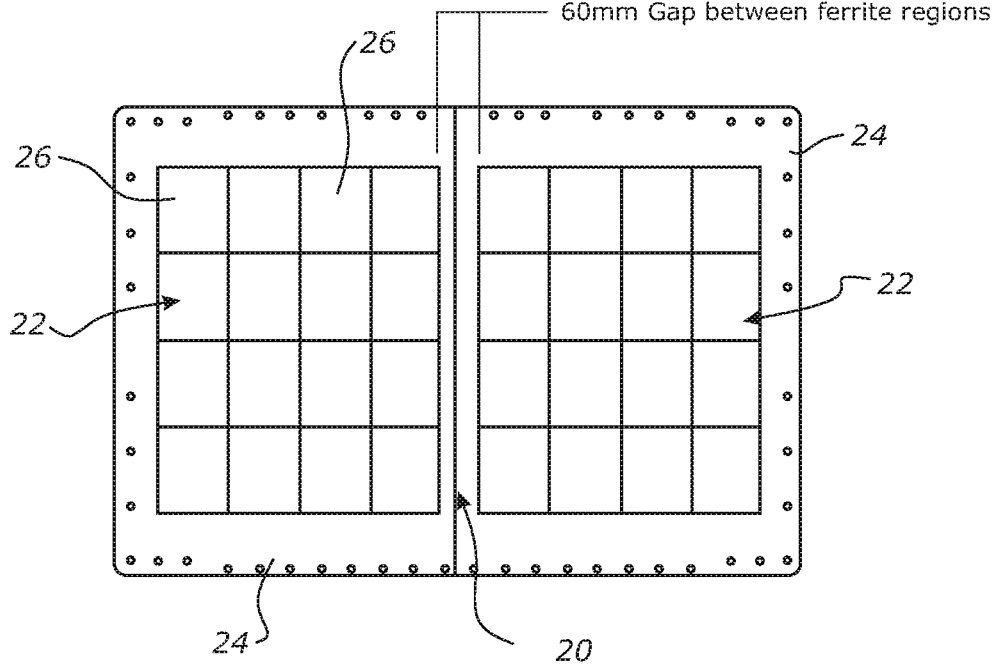
FIG. 4 is a plan view according to FIG. 3 together with a support structure such as a backplate.

FIG. 3 shows permeable layer 22 with the coils and shield 24 removed for clarity. In an embodiment, permeable layer 22 may be provided in two or more sections or blocks, for example separated by a gap or magnetic permeability discontinuity 20 which creates a region of reduced permeability relative to adjacent regions of the permeable layer 22.

The region of reduced relative permeability 20 in the permeable layer is configured to create a higher magnetic reluctance path than would otherwise be present between the two coils 1, 2. Therefore, the region of reduced relative permeability 20 is configured to selectively lower the magnetic flux linkage between the coils 1, 2, so that coils 1 and 2 are essentially magnetically decoupled from each other, but so that the permeable material 22 in layer 22 is still positioned and/or present in a sufficient quantity or dimension to shape a field that is produced or received by the coil for wireless power transfer. The region of reduced permeability 20 can be formed in a number of ways. In an embodiment the permeable layer 22 is constructed from ferrite, and a lower permeability material is used in the selected region as a substitute for ferrite. In an embodiment a lower permeability material such as a soft magnetic composite (SMC) can be used. This may comprise a permeable material such as ferrite powder distributed to a required density in a matrix such as an elastomer or a polymer, for example polyurethane. In an embodiment one or more air gaps or one or more regions or pieces of material having a lower permeability than the adjacent material or materials is placed in the permeable layer. In an embodiment, as shown in FIGS. 2-6 the permeable layer comprises ferrite, and the region 20 is created by separating the ferrite layer 22 into two halves (or multiple sections) with an air gap 20 between them i.e. the ferrite has a gap which is sufficient to provide a discontinuity in the permeability of the permeable material. It will be understood that this approach may be considered to comprise a permeable layer comprising two separate permeable blocks or structures. In an embodiment there are multiple gaps in the ferrite to provide one or more regions of reduced relative permeability, and the region or regions are configured to selectively lower the magnetic flux linkage between two or more coils in the pad.

The region of reduced permeability 20 extends along an axis 13 which is transverse to an axis 9 that runs through the centre, or a central part, of each coil 1, 2. Therefore, axis 13 is transverse to the axis on which the coils 1, 2 are located. In an embodiment the region of reduced permeability 20 extends from a first side of permeable layer 22 to an opposite side of layer 22. In an embodiment region 20 comprises a slot in permeable layer 22. In an embodiment region 20 comprise a plurality of slots, for example a slot extending from each side of permeable layer toward a central portion of layer 22. In an embodiment region 20 is provided in permeable layer 22 at a position centrally of the coils 1, 2, or centrally with respect to adjacent edges of the coils as indicated by axis 13. In an embodiment region 20 comprises a plurality of regions which extend along axes parallel to axis 13.

The ferrite blocks or sections may be themselves constructed from individual pieces of ferrite 26 which may be positioned with close joins 27 (e.g. within 1-2 mm of each other). These close joins are configured to connect adjacent ferrite blocks magnetically to provide highly permeable structures that are magnetically continuous.

Figure 5:
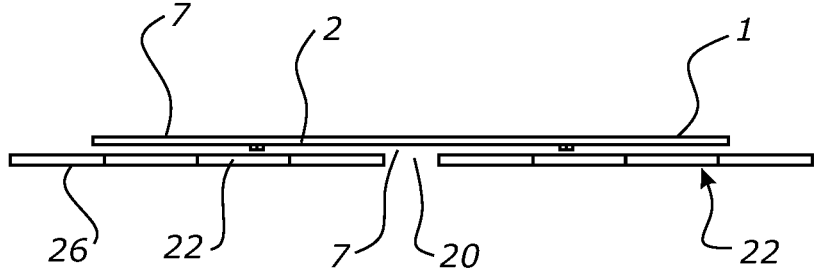
FIG. 5 is an end view of the pad of FIGS. 2-4.
Figure 6:
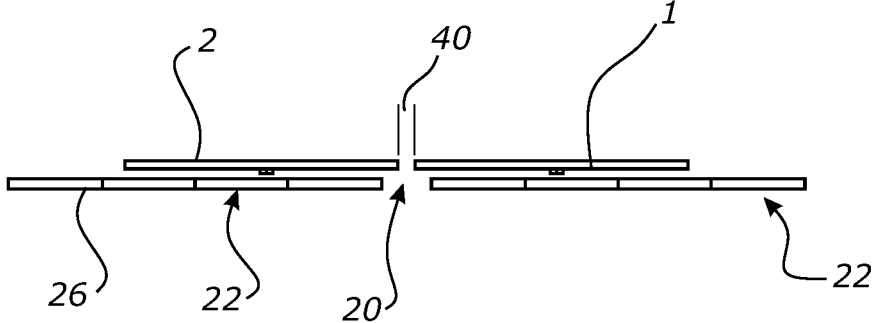
FIG. 6 is an end view according to FIG. 5 in which enclosures surrounding the coils have been removed.

The coils 1, 2, and permeable material 22 is supported and/or positioned using a structure such as a frame. In an embodiment the structure may comprise a plate or frame 24. In an embodiment the structure may comprise a polymer, for example a plastic. In an embodiment the polymer is reinforced. In an embodiment a backplate 30 (shown in FIG. 21) is attached to the structure. In an embodiment the backplate 30 also comprises a magnetic shield. As will be described further below, the coils 1 and 2 and/or the permeable material 22 may be recessed into the structure. In an embodiment the structure can be closed or covered or sealed whereby the coils and/or the permeable material is encased. In an embodiment the coils and/or the permeable material are encased in a non-permeable material, such as a polymer, for example a plastic. In an embodiment, as shown in FIG. 5, the coils 1, 2, are encased in a housing 7, which is fixed to a structure such as a frame.

The coils 1, 2 are each wound using a conductor such as litz wire for example. In an embodiment the conductor is approximately 5 mm in diameter. As can be seen from FIG. 6, the edges or outer periphery of the conductors of coils 1, 2 are separated by a separation distance 40 which is designed to be as small as practicable. In an embodiment the distance 40 between the conductors of adjacent coils is approximately one conductor width i.e. the diameter of the conductor from which a coil is wound. In an embodiment the distance 40 is two conductor widths. In an embodiment the distance 40 is three conductor widths. In an embodiment the distance 40 is four conductor widths. In an embodiment the distance 40 is one to five conductor widths. In an embodiment the distance 40 less than six conductor widths.

In an embodiment frame 24 may comprise a circuit board. In an embodiment permeable material 22 may be provided on or in a circuit board. In an embodiment the coils 1, 2, may be formed as conductive tracks on a circuit board, for example a printed circuit board.

The decoupling arrangement disclosed above can be used with couplers or pads that have more than two coils, as will be disclosed below.

Figure 7:
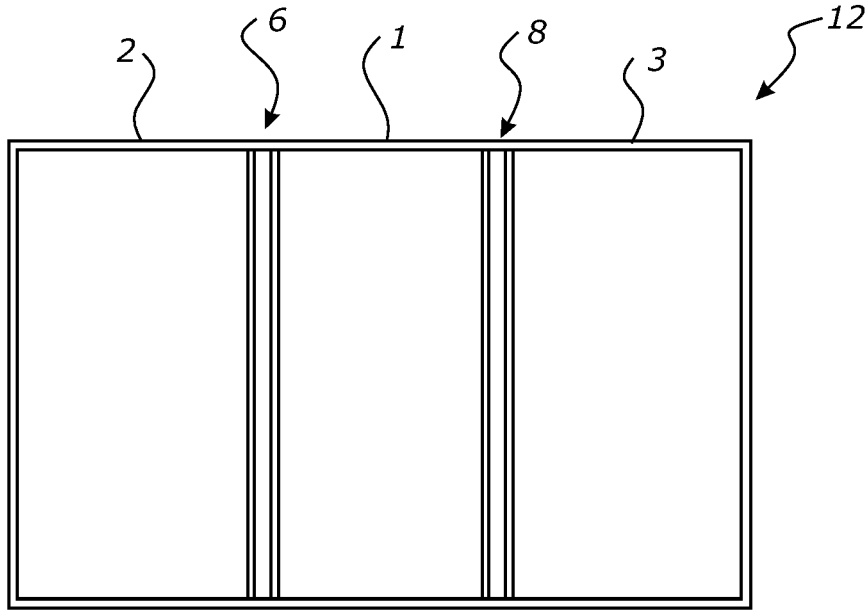
FIG. 7 is a diagrammatic plan view of a coil arrangement for a polyphase pad having three coils.

The proposed coil configuration for a pad 12 shown in FIG. 7 has three coils, being coils 1, 2 and 3. When describing embodiments of this three-coil arrangement below, the coils that were previously referred to as coil 1 and coil 2 are now equivalent to new coils 2 and 3. In an embodiment the coils are arranged in an array, for example being in one layer. In another embodiment the coils are arranged in two or more layers. In the embodiment shown in FIG. 7, one layer contains two outer coils (coil 2 and coil 3), and the other layer contains a centre coil (coil 1). In the embodiment shown in FIG. 7, coil 1 and coil 2 have an overlap region 6, and coil 1 and coil 3 have an overlap region 8.

Figure 8:
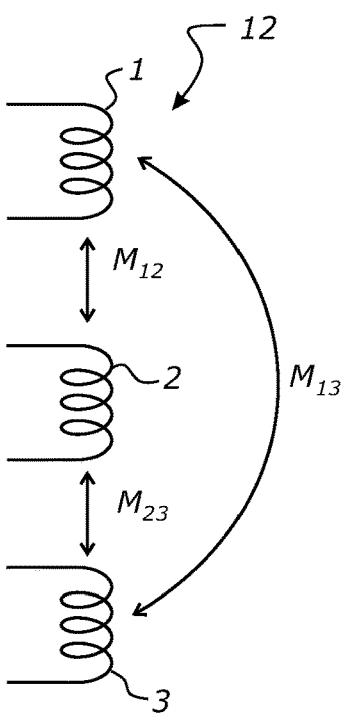
FIG. 8 is a diagram representing the coils of the pad of FIG. 7, showing intercoil or interphase couplings.

Referring now to FIG. 8, the mutual inductances between coils, i.e. the interphase inductances, for the three coils of pad 12 are shown diagrammatically. Therefore, $M_{12}$ is the interphase inductance between coils 1 and 2, $M_{13}$ is the interphase inductance between coils 1 and 3, and $M_{23}$ is the interphase inductance between coils 2 and 3.

As described earlier in this disclosure, in a wireless power transfer system, there will typically be at least two power transfer pads, one primary pad and one secondary pad. In a typical single phase system, each pad will have one coil. In a multiphase system, each pad will typically (but not necessarily) have multiple coils. For example, in a three phase system the primary pad may have three coils (one coil for each phase) and the secondary pad may have three coils (again one for each phase). The pads may be substantially the same or even identical.

Figure 9:
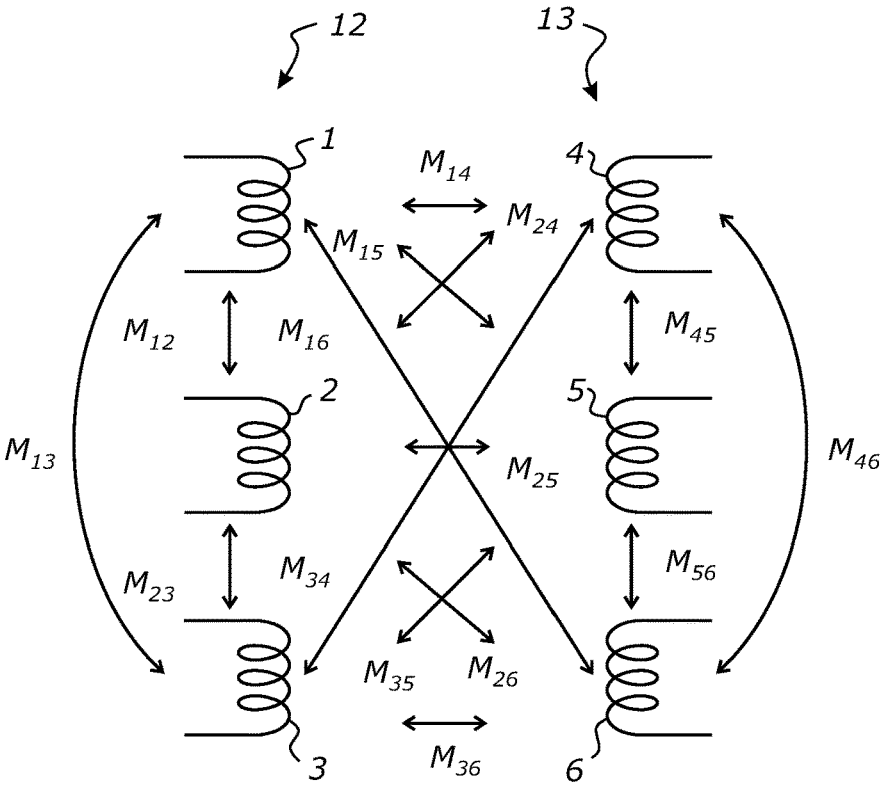
FIG. 9 is a diagram representing the coils of the pad of FIG. 7, and a similar or identical secondary pad having three coils, showing both intercoil or interphase couplings and interpad couplings.

Referring to FIG. 9, primary pad 12 is shown diagrammatically comprising coils 1, 2 and 3 positioned adjacent to, but separated from a secondary pad 13. The secondary pad 13 comprises coils 4, 5 and 6. In order to facilitate efficient transfer of power for each primary phase coil to each secondary phase coil, the coils 1, 2 and 3 of the primary pad 12 are approximately aligned with coils 4, 5 and 6 respectively of the secondary pad 13.

The interphase and mutual inductances for the multiphase pads 12 and 13 are shown in FIG. 9. The interphase couplings for pad 12 have been explained above. The interphase couplings for pad 13 comprise $M_{45}$, $M_{46}$ and $M_{56}$.

The desired mutual couplings for power transfer between phases of the pads are $M_{14}$, $M_{25}$ and $M_{36}$, and it is these mutual couplings that are desired to be of sufficient magnitude to ensure efficient power transfer. If the pads are aligned then the cross-couplings $M_{15}$, $M_{24}$, $M_{34}$, $M_{16}$, $M_{35}$ and $M_{26}$ tend to be relatively low due to the air gap between the pads. In embodiments the cross-couplings can increase advantageously to facilitate inter-pad coupling. The aim of the multi-coil or multi-phase pad arrangement disclosed herein is to minimise, or at least balance $M_{12}$, $M_{13}$, $M_{23}$ (and $M_{45}$, $M_{46}$, $M_{56}$ if a similar multiphase secondary is used) without substantially reducing or limiting $M_{14}$, $M_{25}$ and $M_{36}$. As is known in the art, the degree of coupling between coils can also be expressed as k, where k is between 0 (completely decoupled i.e. no coupling) and 1 (complete coupling). Therefore, the mutual inductance $M_{12}$ can be alternatively expressed as a value $k_{12}$.

A simulation has been developed in ANSYS Maxwell to investigate the effect of different parameters on the coupling coefficients for the pad 12. Before developing a final model, an initial model was made of solid blocks in order to reduce simulation time. The parameters investigated included the distance of the side coils 2 and 3 from the centre coil 1, the arrangement of the layers, and the layout of the ferrite, which was provided in a layer behind, i.e. underneath, the coil layers. In this block-model, the coils are modelled similarly to the structure in the example shown in FIG. 7, where the inner dimensions (hollow part) of each coil were 130.5 mm×382 mm and the outer dimensions were 315 mm×580 mm. These sizes were based on one-half of the standard J2954 DD pad (since the DD pad contains two coils). The thickness of the copper used for the coil turns is 5 mm.

The layer with two side-by-side coils 2 and 3 has its configuration setup so that the two coils are an equal distance away from the middle of the centre coil 1. The exact positioning is determined by optimising the distance between the coils until they are decoupled from the centre coil 1. This position was hence determined by running an ANSYS Maxwell simulation which positioned the two coils directly side-by-side, and then symmetrically increasing the distance between them. This was done until the coupling coefficient between the centre coil and the side coils was less than 5%. This works on the same basis as the bipolar pad and the tripolar pad, where the overlap between each of the two side coils 2 and 3 with the centre coil 1 allows decoupling.

Figure 10:
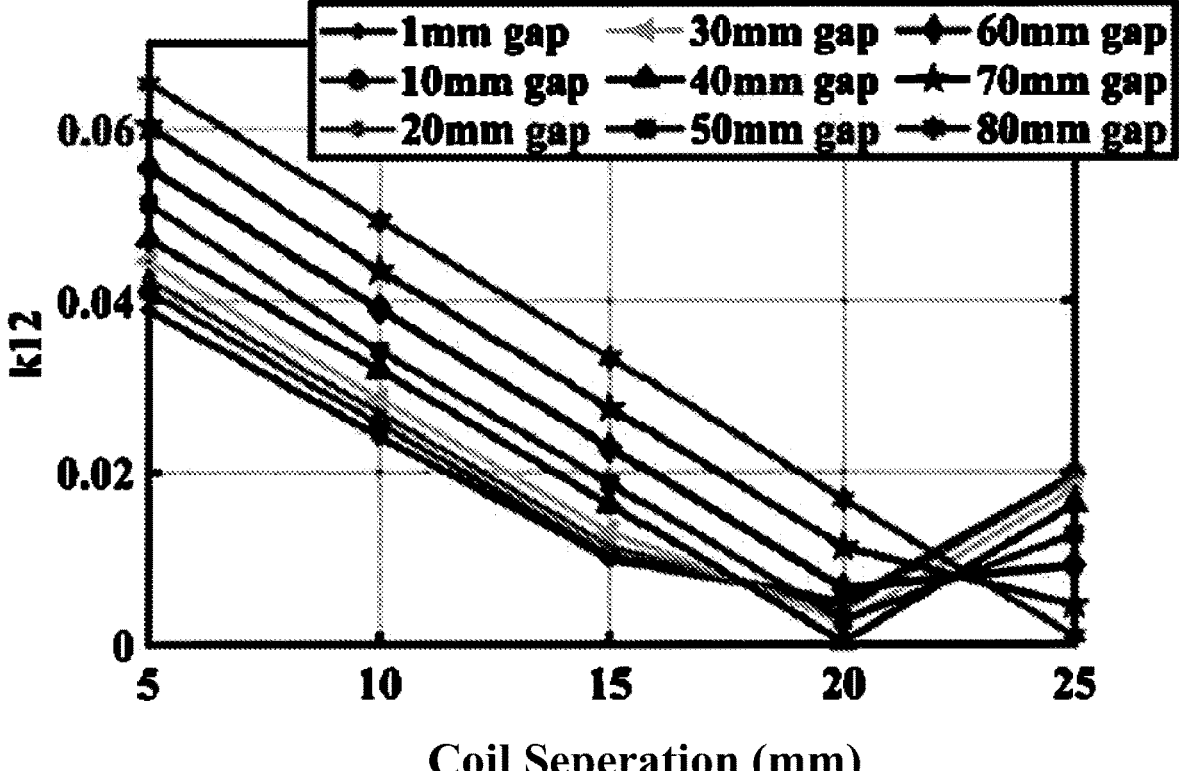
FIG. 10 is a graph of simulation results for centre-to-side coil coupling at different coil separation distances.

FIG. 10 shows the simulation result taken at a primary to secondary separation of 140 mm in the z-direction, with varying distance between the centre coil and side coils. The y-axis shows the coupling factor and the x-axis shows the distance between the midpoint of the centre coil to the midpoint of a side coil. Since the side coils were symmetrical with respect to the centre coil, the results are only shown for the coupling between Coil 1 and Coil 2. Thus the y-axis shows $k_{12}$. Each line plotted shows the results for a different corresponding ferrite gap size. From the results shown in FIG. 10, it was decided to use a separation of 167.5 mm as this corresponded to the lowest coupling for most of the ferrite gap sizes. This corresponds to a 20 mm minimum separation distance between the side coils (coils 2 and 3). The selection of the ferrite size gap is further elaborated below.

As described above, in an embodiment the coils of the pad 12 are configured into two layers, one which contains side coils 2, 3 and the other contains the centre coil 1. The effect of the layer placement has been investigated by simulating two arrangements of the pad. One arrangement placed the centre coil 1 on the top layer (referred to henceforth as Arrangement A) as shown in FIG. 11*a* while the other arrangement has the side coils 2, 3 on top (referred to henceforth as Arrangement B) as shown in FIG. 11*b*. Both FIGS. 11*a* and 11*b* show the pad structures diagrammatically in cross section, with a permeable layer 22 underneath. Layer 22 may be constructed from ferrite for example. The region or space on the side of the coils opposite to the high permeability layer 22 is the region in which a field is created for coupling with a secondary pad. In FIGS. 11*a* and 11*b* the distance between coils 2 and 3 has been greatly exaggerated for clarity. As disclosed above with respect to FIG. 6, the distance between coils 2 and 3 may be approximately one to six conductor widths.

For both of the simulations of the FIGS. 11*a* and 11*b* arrangements, the z-distance (i.e. the horizontal distance as shown in FIG. 9) between the primary pad and secondary pad was varied to give an indication about how positioning would affect the coupling. This distance was measured from the top surface of the bottom pad to the bottom surface of the top pad (i.e. minimum distance between them). The vertical separation between the primary and secondary was varied from 140 mm to 250 mm. The primary and secondary pads in each simulation are identical.

The simulation results showed that there wasn't a significant difference in the interphase-couplings or cross-couplings of the two arrangements A and B, as the difference remained within 1% coupling for these terms. There was, however, a more noticeable difference in the main couplings when the two arrangements were compared. Particularly, the magnitudes for k were higher by about 3-5% coupling, depending on the displacement, in Arrangement B $k_{24} \approx k_{36}$ compared to Arrangement A. The other main coupling term, $k_{12}$, was approximately the same in both configurations, and its magnitude remained larger than $k_{24} \approx k_{36}$ in both arrangements. The results for the main couplings can be seen in FIG. 12, for Arrangement A and Arrangement B respectively.

Thus, as seen in FIG. 12, Arrangement B resulted in all the main couplings being much closer to each other in magnitude (roughly 1% coupling difference). Hence, this configuration was chosen as it would result in more balanced phases.

Using the approach described for the two coil pad 11 above, to investigate if the two side coils 2 and 3 of the FIG. 7 embodiment can be decoupled from one another, despite their close physical proximity, a magnetic discontinuity in the form of a defined region of reduced permeability 20 relative to the remainder of the permeable layer was introduced into the permeable layer 22. The region of reduced relative permeability 20 in the permeable layer is configured to create a higher reluctance path then would otherwise be present between the two coils 2, 3 in the relevant layer. Therefore, the region of reduced relative permeability 20 is configured to selectively lower the magnetic flux linkage between the coils in that layer. The region of reduced permeability 20 can be formed in a number of ways. In an embodiment the permeable layer 22 is constructed from ferrite, and a lower permeability material is used in the selected region as a substitute for ferrite. In an embodiment one or more air gaps is placed in the ferrite. In an embodiment discussed below, the permeable layer comprises ferrite, and the region 20 is created by separating the ferrite layer into two halves (or multiple sections) with an air gap between them i.e. a ferrite gap. It will be understood that this approach may be considered to comprise a permeable layer comprising two separate permeable blocks or structures. In an embodiment there are multiple gaps in the ferrite to provide one or more regions of reduced relative permeability, and the region or regions are configured to selectively lower the magnetic flux linkage between two or more coils in one layer of the pad.

Another advantage with introducing the region of reduced permeability into the permeable layer is that the two resulting separated high permeability regions also helped link the flux of the side coils 2, 3 to a secondary pad. Accordingly, several ANSYS Maxwell simulations were run with the size of the ferrite gap being varied to observe the effects at different separation distance between the primary and secondary pads. These simulations were used to determine the trade off between reducing the interphase (i.e. intra-pad) coupling and maintaining an acceptable main (i.e. inter-pad) coupling. FIG. 13 shows the results for the main and interphase couplings when the primary to secondary height separation is 140 mm. FIG. 14 shows how the cross-coupling terms vary at the same height separation, while FIG. 15 follows the same format (as FIG. 13) but is plotted for a height separation of 250 mm instead. For all three figures, the coupling factor is on the y-axis whilst the x-axis shows the size of the ferrite gap.

From FIG. 13 and FIG. 15, it was determined that a ferrite gap of 40 mm or greater would allow the interphase coupling terms to be reduced below 5% without significantly impacting the main coupling terms. In addition, it was observed from FIG. 14 that the cross-coupling terms increase with increasing ferrite gap. Due to the observations above, it was deemed that a ferrite gap of 60 mm would be used as it offered a good compromise of reducing the interphase coupling to below 5% whilst maintaining high main coupling and limiting the increase in cross coupling.

Therefore, the pad can be structured such that one or more relatively low or reduced permeability regions (such as a gap) in the permeable layer are configured to selectively lower the magnetic flux linkage between two or more coils in one layer of the pad, while facilitating magnetic coupling between at least one of the coils in that layer with a coil in another layer of the pad.

Based on the results above, a CAD model was developed in AutoDesk Inventor™ and then imported into ANSYS Maxwell™ to be simulated to check that it retains the desired properties. The pad is made up of three coil modules (coils 1-3), a layer of ferrite 22, a top lid (not shown), and a non-permeable (for example aluminium) backing plate 24. Each coil module contains an identical 11-turn coil that is 5 mm in thickness. These modules are nearly identical in that each has the same thickness of acrylic underneath and surrounding the coils. The modules only differ in the acrylic engravings needed to allow the coils to fit in such that the modules can be assembled together. To allow the top coils 2, 3 to be centred, their acrylic sheets are slightly smaller in overall dimensions. The ferrite 22 is placed underneath the coil modules along with an aluminium backing plate 24 on the bottom, and an acrylic lid on top of the pad.

FIG. 16 shows the back plate 24 and the ferrite layer 22 which sits on the backing plate and is configured to provide gap 20. As shown in FIG. 16, in an embodiment the ferrite layer 22 is made up of a number of discreet pieces 26 of ferrite. In an embodiment these are configured to provide two regions of high permeability separated by a region of relatively low permeability i.e. an air gap 20.

FIG. 17 shows the structure of FIG. 16, but with structural support members 28 in place which assist with securing the ferrite pieces and provide structural support for the coil modules of the upper layer.

The next layer is shown in place in FIG. 18, in which coil module 1 is located in the centre of the structure, over gap 20.

FIGS. 19 and 20 show the pad structure with the upper coil modules 2 and 3 in place. The coils 2 and 3 overlap coil 1 as described above. The permeable layer 22 extends either side of the coils (i.e. in the y axis) of the upper layer as shown. In an embodiment the permeable layer does not extend beyond the coils in the x axis direction. This assists in defining and shaping the flux path and ensures the required modelled coupling performance is achieved.

In FIG. 21 the structure is shown with lid 30 covering the upper two coil modules.

Two copies of the pad structure disclosed immediately above were imported into ANSYS Maxwell™ to serve as the primary and secondary pads. For this simulation, the positions of the pads were chosen and measured based on SAEJ2954 for a Z-height of Z2. The simulation results for the disclosed embodiment are shown in Table1A and Table 1B under aligned conditions. As shown in the tables, the chosen positions were at the minimum and maximum Z2 heights of 140 mm and 210 mm. The pads were kept aligned in the x-y directions for these measurements. An additional measurement was taken at the maximum lateral y-displacement at the maximum z-height. This was done to observe the effect of misalignment. As shown in the tables, the inter-coupling terms as well as the cross-coupling terms are all below 5% for the tested locations. This more detailed model shows that $k_{14}$ is slightly larger than the other two main coupling terms ($k_{25}$ and $k_{36}$), but it is deemed acceptable as the difference is not large. The main couplings remain in the range of ≈13% to 32% as the positioning changes, which is a change of about 2.5 times. These values are nonetheless deemed acceptable.

TABLE 1 A

| Main and Interphase Coupling Results for Proposed Pad | | | | | |
|---|---|---|---|---|---|
| | Main coupling | | | Interphase coupling | |
| | $k\_14$ | $k\_25$ | $k\_36$ | $k\_12$ | $k\_13$ | $k\_23$ |
| Z = 140 mm | 0.318 | 0.287 | 0.287 | 0.024 | 0.022 | 0.035 |
| Z = 210 mm | 0.168 | 0.140 | 0.140 | 0.034 | 0.032 | 0.038 |
| Z = 210 mm and y = 100 mm | 0.154 | 0.126 | 0.126 | 0.033 | 0.031 | 0.037 |

TABLE 1 B

| Cross Coupling and Inductance Results for Proposed Pad | | | | | | | | |
|---|---|---|---|---|---|---|---|---|
| | Cross coupling | | | | | | Inductances (uH) | |
| | $k\_15$ | $k\_16$ | $k\_24$ | $k\_26$ | $k\_34$ | $k\_35$ | L1 = L4 | L2 = L5 | L3 = L6 |
| Z = 140 mm | 0.057 | 0.058 | 0.057 | 0.013 | 0.058 | 0.013 | 103.019 | 80.045 | 79.969 |
| Z = 210 mm | 0.051 | 0.052 | 0.051 | 0.001 | 0.052 | 0.001 | 99.288 | 78.563 | 78.524 |
| Z = 210 mm and y = 100 mm | 0.047 | 0.047 | 0.046 | 0.012 | 0.047 | 0.001 | 99.250 | 78.640 | 78.560 |

Thus, the simulation results of the pad structure agree with experimental results and suggest that the interphase coupling terms remain smaller than 5% while main coupling terms are high enough to be acceptable. The cross-phase coupling terms remain close to 5% at worst, but are still significantly lower than the main coupling terms. As mentioned earlier in this disclosure, in other embodiments cross-coupling can be advantageous, for example if there is x-axis misalignment, or for example if there is a single coil (i.e. single phase) secondary then cross-coupling is desirable for efficient power transfer. For example, as shown in FIG. 22, in an embodiment, pad 12 may transfer power to or from a secondary coupler or pad 32 that has a single coil 33 and a permeable layer 34. The coils 1, 2, and 3 all couple with coil 33 to transfer power.

It can also be seen that the region of reduced permeability has been configured to provide balanced minimal interphase couplings i.e. the interphase couplings are all of a similar magnitude. This has the advantage that the reactive load seen by a multiphase power supply, for example, is balanced across phases, so there is no unnecessary stress on switches.

Turning to FIG. 23, a diagrammatic cross section of a coupling structure 41 that comprises a linear array of three or more coils, referenced in this example 1-4, which are located side-by-side over a permeable layer 22 having regions 20 of reduced permeability which are position between the centers or central regions of adjacent coils and dimensioned to decouple, or at least minimize coupling between, adjacent coils using the methods disclosed above. Such a structure may be optionally lengthened by adding further coils and permeable material as required. The structure of FIG. 23 may allow for misaligned wireless pick-up or receiving apparatus, as only coils nearest the receiver need be activated, without affecting other coils. The structure of FIG. 23 may allow dynamic power transfer (i.e. to a moving receiver) by sequentially activating coils as the receiver moves along the structure (i.e. over the coils across the page as shown in the Figure). In an embodiment the structure of FIG. 23 is expanded in both the x and y direction, the x direction being for example an axis across the page as shown in the figure and the y direction being a direction into or out of the page. In an embodiment expansion in the y direction comprises replicating rows of coils and pieces of the permeable layer as shown in the row illustrated in FIG. 23.

Referring to FIGS. 24 and 25, an example of a further coupling structure referenced 42 is illustrated in plan view and cross-section, respectively. In these figures, two structures which are similar to those described in FIGS. 2-6 are oriented perpendicularly and superimposed. Thus, there are coils 1 and 2 in a first layer, then coils 2*a* and 2*a* in a second layer oriented at right angles to the coils of the first layer, and a permeable layer 22 beneath the coils. The permeable layer has regions 20 of reduced permeability which are dimensioned as described above to decouple the coils. The coils may be separated by a required distance as indicated by reference 40. As described earlier in this specification, the distance 40 may be for example in the order of one to 6 conductor widths. In an embodiment the distance 40 is selected together with the dimension of region 20 to provide decoupling. In an embodiment the permeable layer may extend beyond the coils. In an embodiment the coils may overlap (so dimension 40 may comprise an overlap distance). In an embodiment the dimensions of 40 and 20 may be different or may vary dependent on coil shape. In an embodiment a central coil 3 may be provided (not shown in FIG. 25 for clarity). Coil 3 is shown as surrounding the other coils for clarity. In an embodiment coil 3 may overlap the other coils.

In an embodiment the structure 42 may be expanded or tiled in one or more directions to create larger coupling structures.

This document discloses a multiphase wireless power transfer pad composed of an array of coils with gapped ferrite underneath and reveals simulation results which suggest that all three coils can be decoupled. It is also apparent that the structures disclosed can be used with coils of varying shape or geometry, and that in an embodiment the structures can be increased in size to incorporate pads that have more than three coils. In an embodiment the region or regions of reduced permeability are configured to have non-uniform or non-regular geometry which varies in width or thickness to increase the reluctance of one or more flux paths to provide a required coupling coefficient between coils of the coupling structure. In an embodiment, the region or regions of reduced permeability are configured to provide a compromise or required ratio for coupling flux (for coupling with another pad) against the extend or magnitude of interphase coupling. Moreover, this arrangement is configured such that its construction simple compared to existing pad configurations which achieve decoupling, as it is made up of near-identical modules which can be stacked conveniently in layers.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements or steps. Thus, such conditional language is not generally intended to imply that features, elements or steps are in any way required for one or more embodiments or that one or more embodiments necessarily include logic for deciding, with or without other input or prompting, whether these features, elements or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, or Z). Thus, such disjunctive language is not generally intended to, and should not, imply that certain embodiments require at least one of X, at least one of Y, and at least one of Z to each be present.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

It should be emphasized that many variations and modifications may be made to the above-described embodiments, the elements of which are to be understood as being among other acceptable examples. All such modifications and variations are intended to be included herein within the scope of this disclosure and protected by the following claims.

The invention claimed is:

1. A multiphase wireless power pad comprising:
first and second coils arranged in a first coil layer at a coil side of a guidance layer;
a third coil arranged in a second coil layer at the coil side of the guidance layer, and overlapping the first and second coils to decouple therefrom;
a first magnetically permeable portion arranged in the guidance layer and magnetically associated with the first and third coils;
a second magnetically permeable portion arranged in the guidance layer and magnetically associated with the second and third coils; and
a magnetically reluctant portion arranged intermediate the first and second magnetically permeable portions to decouple the first and second coils from each other.

2. The multiphase wireless power pad of claim 1, wherein the second coil layer is arranged between the first coil layer and the guidance layer.

3. The multiphase wireless power pad of claim 1, wherein the magnetically reluctant portion is greater in width than a gap between the first and second coils.

4. The multiphase wireless power pad of claim 1, wherein the first and second coils are arranged symmetrically with respect to a center line at which the third coil is symmetrically arranged.

5. The multiphase wireless power pad of claim 1, further comprising:
a fourth coil arranged in the second coil layer and overlapping the first and second coils, wherein the first and second coils extend in a first planar direction perpendicular to a second planar direction in which the third and fourth coils extend.

6. The multiphase wireless power pad of claim 1, wherein a width of the magnetically reluctant portion is greater than 40 mm.

7. The multiphase wireless power pad of claim 6, wherein the width is 60 mm.

8. The multiphase wireless power pad of claim 1, wherein an extent by which the third coil is decoupled from the first and second coils is balanced with respect to an extent by which the first and second coils are decoupled from each other.

9. A system comprising a pair of the multiphase wireless power pads of claim 1 associated with each other.

10. The system of claim 9, wherein the pair of multiphase wireless power pads are separated from each other by a distance ranging from 40 mm to 250 mm.

11. The system of claim 9, wherein the pair of multiphase wireless power pads are aligned with each other.

12. A multiphase wireless power pad comprising:
first and second coils arranged in a coil layer;

first and second magnetically permeable portions arranged in a guidance layer and magnetically and respectively associated with the first and second coils; and a magnetically reluctant portion arranged intermediate the first and second magnetically permeable portions to decouple the first and second coils from each other, and being greater in width than a gap between the first and second coils.

13. The multiphase wireless power pad of claim 12, wherein the coil layer is a first coil layer at a coil side of the guidance layer, and wherein the multiphase wireless power pad further comprises:

a third coil arranged in a second coil layer at the coil side of the guidance layer, and overlapping the first and second coils to decouple therefrom.

14. The multiphase wireless power pad of claim 13, wherein the second coil layer is arranged between the first coil layer and the guidance layer.

15. The multiphase wireless power pad of claim 13, wherein the first and second coils are arranged symmetrically with respect to a center line at which the third coil is symmetrically arranged.

16. The multiphase wireless power pad of claim 13, further comprising:

a fourth coil arranged in the second coil layer and overlapping the first and second coils, wherein the first and second coils extend in a first planar direction perpendicular to a second planar direction in which the third and fourth coils extend.

17. The multiphase wireless power pad of claim 13, wherein an extent by which the third coil is decoupled from the first and second coils is balanced with respect to an extent by which the first and second coils are decoupled from each other.

18. The multiphase wireless power pad of claim 12, wherein a width of the magnetically reluctant portion is greater than 40 mm.

19. The multiphase wireless power pad of claim 18, wherein the width of the magnetically reluctant portion is greater than 60 mm.

* * * * *